Jan. 28, 1958  J. A. COLE  2,821,056
ATTACHMENT FOR POWER MOWERS
Filed Dec. 12, 1956  3 Sheets-Sheet 1

INVENTOR.
JAMES A. COLE
BY
Salvatore G. Militana
ATTORNEY

Jan. 28, 1958  J. A. COLE  2,821,056
ATTACHMENT FOR POWER MOWERS
Filed Dec. 12, 1956  3 Sheets-Sheet 2
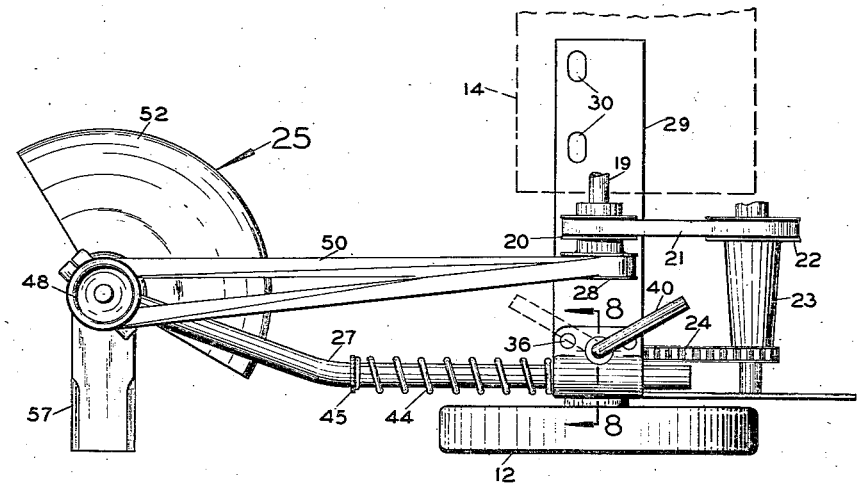
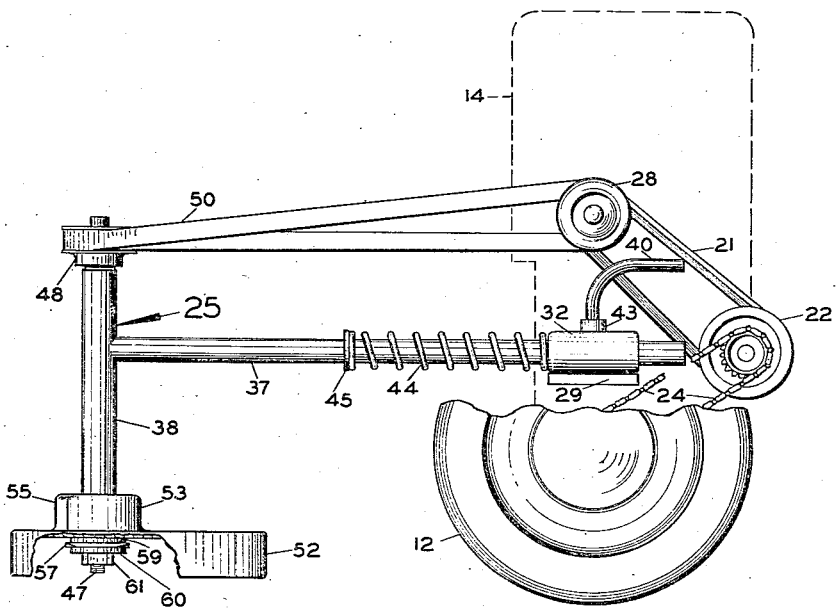
INVENTOR.
JAMES A. COLE
BY
ATTORNEY Jan. 28, 1958   J. A. COLE   2,821,056
ATTACHMENT FOR POWER MOWERS
Filed Dec. 12, 1956   3 Sheets-Sheet 3
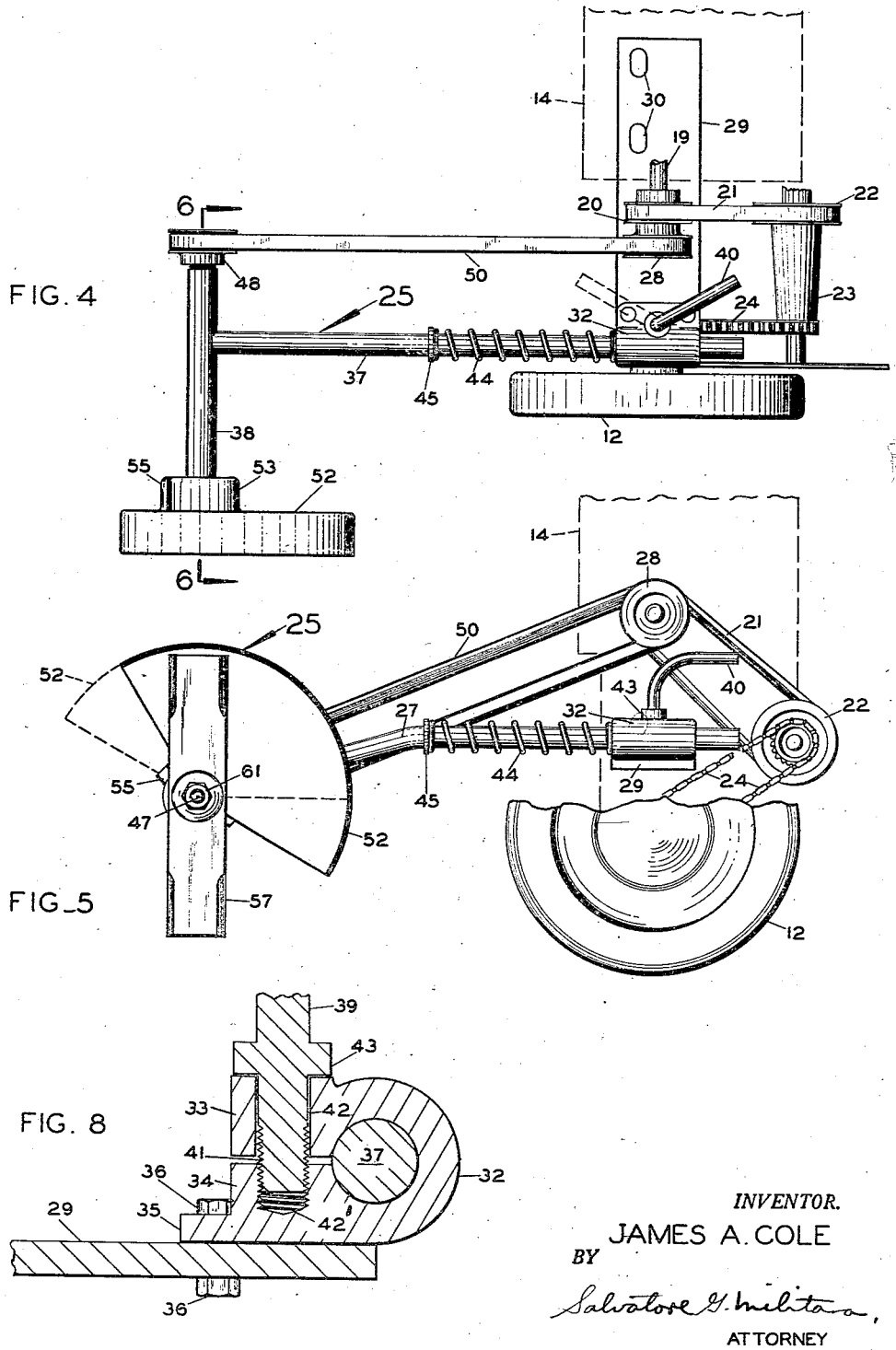
INVENTOR.
JAMES A. COLE
BY
Salvatore G. Militana,
ATTORNEY

United States Patent Office 2,821,056
Patented Jan. 28, 1958

2,821,056

ATTACHMENT FOR POWER MOWERS

James A. Cole, North Miami Beach, Fla., assignor to E. Z. Edge, Inc., Miami, Fla., a corporation of Florida Application December 12, 1956, Serial No. 627,863

1 Claim. (Cl. 56—25.4)

This invention relates to apparatus for cutting and edging lawns and is more particularly directed to an attachment for power mowers for trimming and edging lawns.

A principal object of the present invention is to provide an attachment for power mowers, which attachment is simple in construction and operation and which is readily mounted on any conventional mower.

A further object of the present invention is the provision of an attachment for power mowers described as above which may be used to cut and trim lawns or to operate as a lawn edger.

A still further object of the present invention is to provide an attachment for power mowers characterized hereinabove wherein the power to operate the attachment is derived from the power mower and transmitted thereto by merely the addition of a pulley on the motor shaft of the power mower.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claim.

In the drawings:

Figure 2 is an enlarged top plan view thereof with the power mower shown in part and the attachment in its lawn cutting position.

Figure 3 is a side elevational view thereof with parts broken away.

Figure 4 is a top plan view similar to Figure 2 with the attachment swung to its lawn edging position.

Figure 5 is a side elevational thereof with parts broken away.

Figure 8 is an enlarged fragmentary cross sectional view taken along the line 8—8 of Figure 2.

Figure 1:
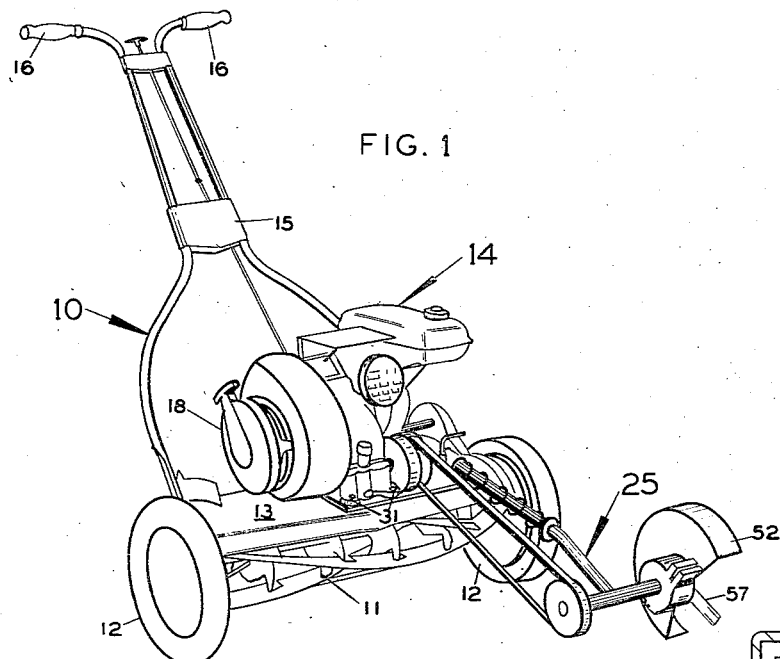
Figure 1 is a perspective view of a conventional power mower having a combined lawn edging and cutting attachment according to my invention mounted thereon.

Referring to the drawings wherein like numerals are used to designate similar parts throughout the several views, the numeral 10 refers to a power mower of conventional design consisting generally of a frame to which a rotary cutter 11, roller (not shown) and a pair of spaced wheels 12 are rotatably mounted and upon which frame a support plate 13 is mounted supporting a motor 14. Handles 15 are secured to the frame and extend rearwardly and upwardly terminating in laterally extending hand grips 16. The motor 14 is provided with a crank device 18 mounted on a motor shaft 19 which extends therethrough to the other side of the motor 14 where a pulley 20 is secured thereon. A belt 21 received by the pulley 20 extends over a second pulley 22 mounted on a power transmission shaft 23. A chain drive 24 transmits rotary power from the power shaft 23 to the wheels 12 and cutters 11 in the usual manner.

To mount my combination lawn edger attachment 25 on the power mower 10 requires solely the addition of a pulley 28 on the motor shaft 19 for transmitting rotary power to the attachment 25. The attachment 25 consists of an elongated base plate 29 which is positioned on the support plate 13 beneath the motor 14, being secured by motor bolts 31 extending through the base of the motor 14, bores 30 in the base plate 29 and the support plate 13. At the extreme end of the elongated base plate 29 there is mounted a split shaft support 32 having a pair of spaced lugs 33 and 34 with a support plate 35 secured as by welding to the lower lug 34 and bolted as at 36 to the elongated base plate 29. Journaled within the shaft support 32 is a shaft 37 which extends forwardly of the power mower 10 and at whose free end a tubular housing 38 is welded or otherwise secured intermediate its end portions and at approximately right angle to the shaft 37.

Referring to Figures 2 and 8 particularly, means are provided on the bearing support 32 for locking the shaft 37 in position thereon comprising a rod 39 bent at its upper end to form a handle 40 and whose other end is threaded as at 41 extending through a bore 42 in the upper lug 33 and received by a threaded bore 42' in the lower lug 34. A collar 43 mounted on the rod 39 in abutting relation with the lug 33 will depress the lug 33 in the direction of the lower lug 34 and thereby lock the shaft support 32 on the shaft 37 upon rotating the rod 39 by swinging the handle 40. For reasons explained hereinafter, the shaft 37 is urged in a forwardly direction by a coil spring 44 mounted on the shaft 37 with one end abutting against the shaft support 32 and the other end against a collar 45 mounted on the shaft 37.

Mounted within the tubular housing 38 are tubular collars 46 acting as bearings for a rotatable shaft 47 extending beyond the ends of the housing 38. At one end of the shaft 47 is mounted a pulley 48 secured thereto by a set screw 49 and mounted thereon in coplanar relation with the pulley 28, over which pulleys 28 and 48 a belt 50 extends in engagement relation. A washer 51 mounted on the rotatable shaft 47 is interposed between the end of the tubular housing 38 and the pulley 48.

At the other end of the tubular housing there is mounted a cutter guard 52 to which is secured a block 53 having an opening 54. A complementary lower block 55 with an opening 56' is secured about the tubular housing 46 to the upper block by bolts 56 extending through their respective lug portions to fasten the blade guard 52 on the tubular housing 38. Within the guard 52 and mounted on the shaft 47 to revolve therewith is a blade 57. A nut 58 threaded on the shaft 47 forces the blade 57 into tight engagement with a shoulder 58' on the shaft 47. Washers 59 and 60 are mounted on the shaft 47 and interposed on either side of the blade 57. It is to be noted that the rod 37 is bent as at 27 in order that the blade 57 is at the desired height when shifted from its lawn trimming position to the edging position as is best shown by Figures 3 and 5.

It is to be noted that the attachment 25 is readily placed on a conventional power mower by simply removing the motor bolts 31, slipping the base plate 29 beneath the motor 14 and threading the bolts 31 securely back in their original position through the bores 30 in the base plate 29. The bores 30 on the base plate 29 are oval shaped in order to accommodate variations in spacings of the motor bolts 31.

Figure 6:
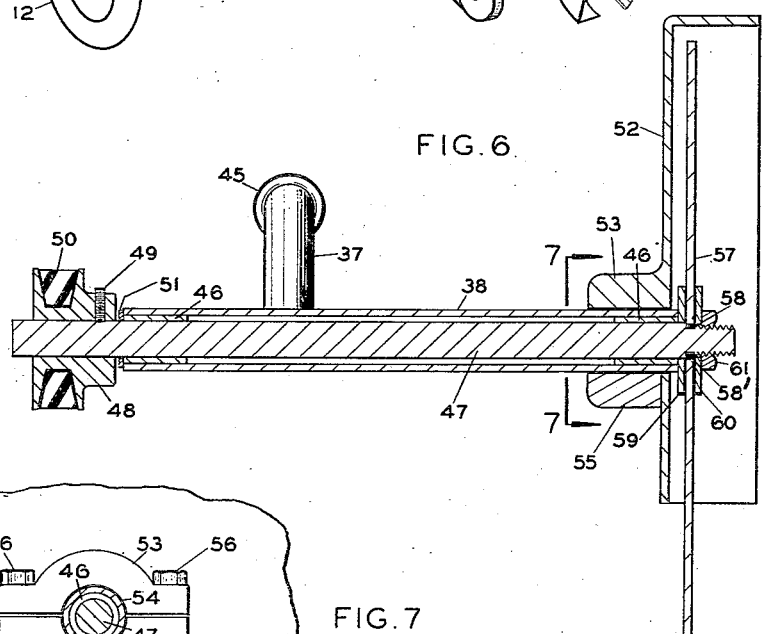
Figure 6 is an enlarged cross sectional view taken along the line 6—6 in Figure 4.
Figure 7:
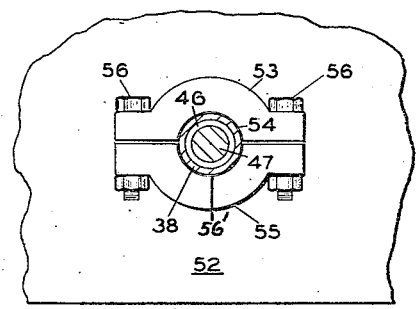
Figure 7 is a fragmentary detailed sectional view taken along the line 7—7 of Figure 6.

Now, the pulley 28 is secured on the motor shaft 19 and the belt 50 slipped over the pulleys 48 and 28 which are in alignment when the device 25 is in its edging position as shown by Figures 4, 5 and 6. With the motor 14 running, the rotating motor shaft 19 and pulley 28 will cause the belt 50 to revolve, the pulley 48, shaft 47 and cutting blade 57 to likewise rotate. Since the blade 57 is in its upright position, rotating in a vertical plane, the blade will cut into the edge of a lawn and thereby edge it.

When it is desired to trim a lawn especially those areas that are not readily accessible to a power mower such as adjacent a wall, etc., the handle 40 of the lock rod 39 is grasped and rotated to unthread same from the threaded bore 42' of the lower lug 34 causing the shoulder 43 to move upwardly or in a direction away from the upper lug 33. This permits the split shaft support 32 to open slightly and release its grip on the rod 37. The coil spring 44 now yieldingly urges the rod 37 outwardly thereby maintaining the belt 50 in a tightened condition until the support 32 is again locked. The housing 38 is now grasped and forced to rotate about the rod 37 compelling the blade 57 and housing 52 to swing about in a clockwise direction as viewed in Figure 6 until the housing 52 is positioned horizontally in close proximity to the grass to be cut. The handle 40 is now revolved in the opposite direction to tighten the collar 43 against the upper lug 33 and force the split rod support to become tightened on the rod 27 and hold same securely. The blade 57 now revolves in a horizontal plane cutting the grass, the blade housing 52 permitting the blade 57 to reach grass growing near walls, buildings, etc., which cannot be cut by the power mower itself.

While I have illustrated a select embodiment of my invention, I do not wish to be limited to the constructional features herein shown except as claimed.

What I claim as new is:

In an attachment for power mowers having support means, a motor secured by bolts on said support, a shaft mounted on said motor and a pulley mounted on said shaft, the combination comprising a support plate adapted to be mounted on said support means, said support plate having bores for receiving said motor bolts a split support secured to said support plate, said split support having an upper and lower lug, said lugs having complimentary bores, a lock rod having a threaded end portion, said lock rod extending through said bore of said upper lug and threadedly engaging said bore of said lower lug, a shoulder mounted on said lock rod in contact relation with said upper lug, an arm member mounted in said split support whereby upon rotation of said lock rod, said shoulder forces said upper lug in the direction of said lower lug to lock said arm member, a tubular housing secured intermediate its ends at substantially right angle to one end of said arm member, a shaft rotatably mounted in said housing, a pulley mounted on one end of said shaft in alignment with said first named pulley, a belt engaging said pulleys, a blade mounted on the other end of said shaft, a blade guard secured to said tubular housing adjacent said blade, a collar mounted on said arm member, and a coil spring mounted on said arm member and extending between said collar and said split support for yieldingly urging said pulleys in a direction away from each other and maintaining said belt in a taut condition when said lock rod has been rotated to loosen said arm member in said split support.

References Cited in the file of this patent

UNITED STATES PATENTS

| | | |
|---|---|---|
| 2,538,230 | Boggs | Jan. 16, 1951 |
| 2,618,919 | Hutchens | Nov. 25, 1952 |
| 2,632,990 | Stricklen et al. | Mar. 31, 1953 |
| 2,680,945 | Reed | June 15, 1954 |
| 2,719,398 | Hutchens | Oct. 4, 1955 |
| 2,721,432 | Machovec | Oct. 25, 1955 |
| 2,724,230 | Burmeister | Nov. 22, 1955 |
| 2,739,437 | True | Mar. 27, 1956 |
| 2,771,730 | True | Nov. 27, 1956 |